United States Patent [19]
Haumaier

[11] 3,994,354
[45] Nov. 30, 1976

[54] CONSTANT SPEED VEHICLE DRIVE UNIT

[75] Inventor: Robert Haumaier, Mahopac, N.Y.

[73] Assignee: Haumaier Automotive Energy Saver, Inc., Bedford Hills, N.Y.

[22] Filed: Aug. 8, 1975

[21] Appl. No.: 602,978

[52] U.S. Cl. .............................. 180/65 C; 74/710.5; 180/54 C; 180/70 R
[51] Int. Cl.² ........................................ B60K 21/10
[58] Field of Search ............. 180/65 R, 65 A, 44 E, 180/43 B, 70 R, 75, 88, 6.2, 54 C; 74/720.5, 710.5, 793; 192/4 R

[56] References Cited
UNITED STATES PATENTS

| | | | |
|---|---|---|---|
| 1,684,314 | 9/1928 | Guernsey | 180/65 R |
| 2,618,175 | 11/1952 | Bruce | 74/720.5 |
| 3,352,373 | 11/1967 | Tuck | 180/65 R |
| 3,375,737 | 4/1968 | Holtan | 74/710.5 |
| 3,601,211 | 8/1971 | Finke | 74/710.5 |
| 3,698,498 | 10/1972 | Stanford | 74/710.5 |
| 3,799,284 | 3/1974 | Hender | 180/65 A |
| 3,861,484 | 1/1975 | Joslin | 180/65 A |
| 3,861,485 | 1/1975 | Busch | 180/65 R |

Primary Examiner—Robert R. Song
Assistant Examiner—David M. Mitchell
Attorney, Agent, or Firm—Cooper, Dunham, Clark, Griffin & Moran

[57] ABSTRACT

A drive mechanism for powering the drive wheel of a vehicle utilizing a drive shaft powered at a substantially constant speed. A transaxle mechanism is utilized having a power input shaft coupled to the drive shaft. The transmission of power through the transaxle mechanism to the output shaft, and the speed of the vehicle, is controlled by the selective braking of a control shaft forming a part of the transaxle mechanism. The drive shaft is advantageously driven by an electric motor operated at substantially constant speed, energized by an electric generator which is in turn driven by an internal combustion engine operated at substantially constant speed.

8 Claims, 1 Drawing Figure

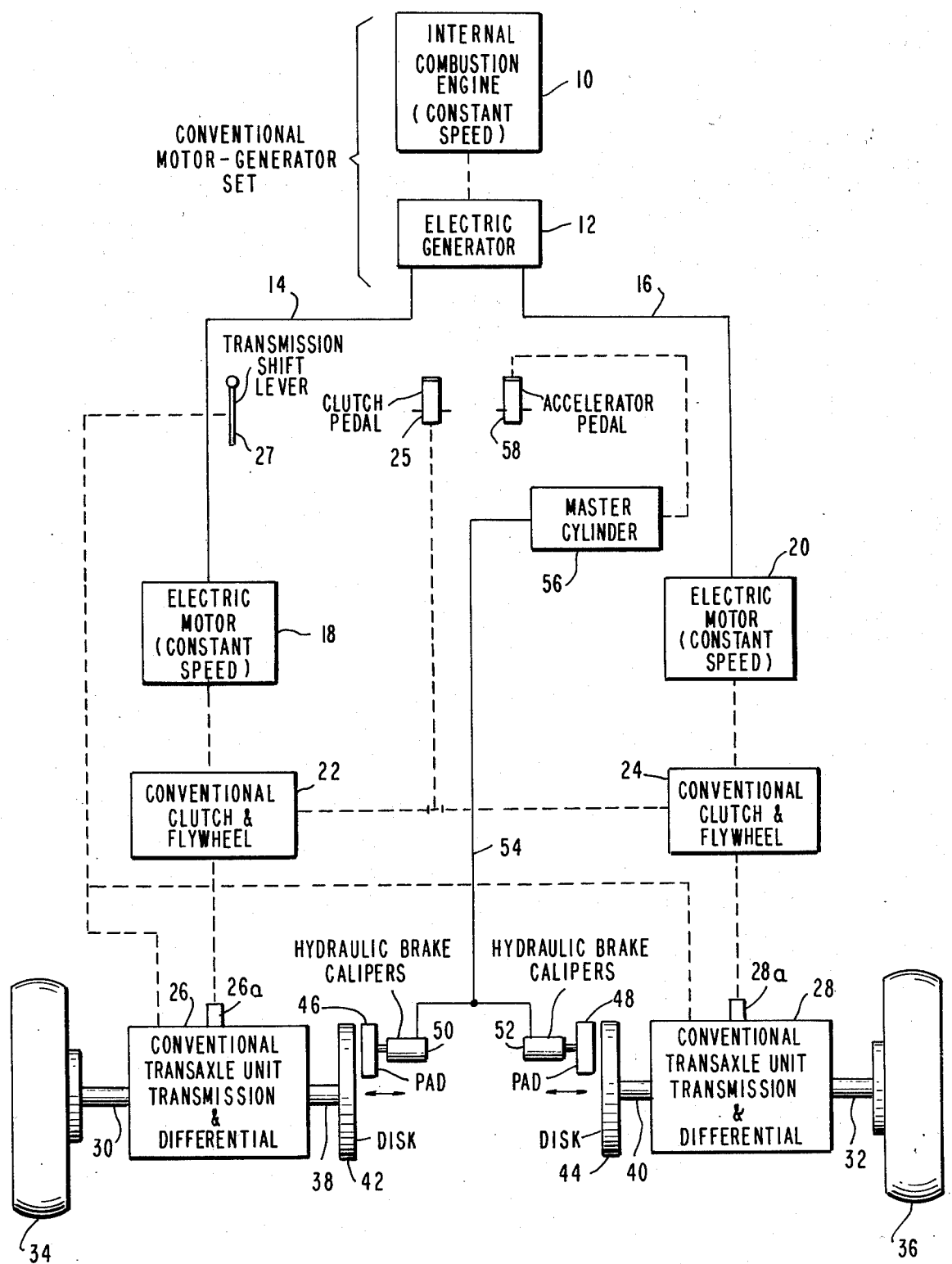

CONSTANT SPEED VEHICLE DRIVE UNIT

BACKGROUND AND BRIEF DESCRIPTION OF THE INVENTION

This invention relates to drive mechanisms for powering the drive wheels of vehicles. More particularly, it provides a unique drive mechanism for powering the drive wheel of a vehicle utilizing motors driven at a substantially constant speed at which efficiency of performance is optimized.

With the energy crisis confronting the world, it is imperative to produce vehicles which are as efficient and consume as little fuel and emit as few combustion by-products as possible. The traditional internal combustion engine as heretofore used in drive mechanisms for vehicles is notoriously inefficient, particularly because it is typically operated over a wide range of speeds within which the efficiency of performance varies considerably. The present invention utilizes a drive shaft which is driven at a constant speed, so that the efficiency of power development may be optimized and emissions minimized. The constant speed drive shaft is selectively coupled through a unique transaxle unit to provide for the driving of a vehicle wheel at variable speeds. In particular, selective braking of a control shaft in the transaxle unit provides the desired coupling between the constant speed drive shaft and the drive wheel of the vehicle.

In a presently preferred embodiment of the invention, an internal combustion engine is regulated to run at a constant speed. The engine drives an electric generator which in turn drives an electric motor. The motor is driven at constant speed, and is coupled through a conventional clutch and flywheel mechanism to the transaxle unit mentioned above. The transaxle unit includes power input and output shafts as well as a control shaft. Depending upon the selective braking of the control shaft, the power output shaft is caused to rotate during rotation of the power input shaft. Such selective braking of the control shaft to control the vehicle speed is achieved, for example, by actuation of the accelerator pedal in an automobile which is coupled to the braking mechanism for the transaxle control shaft. The accelerator pedal is not used as a control mechanism for the supply of fuel as is the case with automobiles presently in use. As presently preferred, a single internal combustion engine driving a single electric generator may be utilized to power a plurality of electric motors each driving an individual one of the drive wheels through an individual transaxle mechanism associated with that wheel. Alternatively, a single transaxle unit may be utilized to power a plurality of drive wheels through a conventional differential mechansim.

The following patents are representative of the state of the art.

| U.S. Patent No. | Issue Date | Inventor |
| --- | --- | --- |
| 3,260,134 | July 12, 1966 | Bowen et al |
| 3,352,373 | Nov. 14, 1967 | Tuck |
| 3,375,737 | April 2, 1968 | Holtan |
| 3,525,874 | Aug. 25, 1970 | Toy |
| 3,530,356 | Sept. 22, 1970 | Aronson |
| 3,543,873 | Dec. 1, 1970 | Toy |
| 3,656,202 | Feb. 23, 1971 | Evans |
| 3,713,504 | Jan. 30, 1973 | Shimer et al |

-continued

| U.S. Patent No. | Issue Date | Inventor |
| --- | --- | --- |
| 3,861,484 | Jan. 21, 1975 | Joslin |

BRIEF DESCRIPTION OF THE DRAWING

The drawing illustrates a presently preferred embodiment of the invention in block diagram form.

DETAILED DESCRIPTION

Referring to the drawing, a drive mechanism for powering the drive wheels of a vehicle is shown. The mechanism is self-contained in the vehicle, and utilizes an engine 10 such as an internal combustion engine, e.g., a gasoline engine. The engine is regulated to operate at a substantially constant speed. The engine 10 drives an electric generator 12 which generates an electric output on lines 14 and 16 connected to electric motors 18 and 20. The electric motors are energized so that they operate at substantially constant speed but at variable torque depending upon the output power developed thereby. Each of the electric motors is coupled through a conventional clutch and flywheel mechanism (22 and 24) to the power input shaft (26a and 28a) of a conventional transaxle unit (26 and 28). Each transaxle unit comprises a transmission and differential mechanism as is well known. The transaxle units include power output shafts 30 and 32 connected to drive wheels 34 and 36 of the vehicle. The transaxle units also include control shafts 38 and 40 that are connected to brake disks 42 and 44. Brake pads 46 and 48 selectively bear against the brake disks to selectively control the application of driving power from the clutch and flywheels 22 and 24 through the transaxle units 26 and 28 to the drive wheels 34 and 36, as explained in more detail below. The brake pads 46 and 48 are actuated by hydraulic pistons of conventional brake calipers 50 and 52, controlled in common by hydraulic fluid in a common line 54 connected to master cylinder 56. The master cylinder is controlled by accelerator pedal 58, for example, the conventional accelerator pedal in an automobile presently used to control the carburetor. In this case, the accelerator pedal controls the flow of fluid from the master cylinder 56, in turn controlling the application of braking force against the disks 42 and 44 by the brake pads 46 and 48.

To explain the operation of the invention, the internal combustion engine 10 is regulated so that it operates at substantially constant speed. This speed is chosen to optimize its performance, so that the engine operates at maximum efficiency and hence minimum fuel consumption and minimum fuel emission. The engine 10 drives electric generator 12 which in turn energizes the electric motors 18 and 20 which are driven at substantially constant speed. The transaxle units 26 and 28 include transmission gears therein, under the control of transmission shift lever 27 coupled thereto, typically to provide provide four or five speed ranges in the forward direction of the vehicle, a reverse direction, and a neutral position. The clutches in the conventional clutch and flywheel mechanisms 22 and 24, under the control of clutch pedal 25 coupled thereto, are simply to permit the shifting of gears in the transaxle units. The flow of power to the drive wheels 34 and 36 of the vehicle is determined by selective braking of the brake disks 42 and 44, about to be described.

Each transaxle unit, as noted above, is conventional. Maximum power is not transmitted through that unit except at those times that the brake disks (42 and 44) are completely held against any movement by brake pads 46 and 48. If the brake disks 42 and 44 are completely free to rotate, no power will be transmitted through the transaxle units to the power output shafts 30 and 32. As the brake disks 42 and 44 slip against the brake pads 46 and 48, partial power is transmitted through the transaxle units. Thus, although the power input shafts 26a and 28a of the transaxle units are continuously rotating, the power output shafts 30 and 32 are only driven to rotate depending upon the degree of braking of the brake disks 42 and 44. Within any given speed range of the transmission, no braking of the brake disks 42 and 44 produces no movement of the power output shafts 30 and 32, corresponding to zero vehicle miles per hour. Total braking of the brake disks so that they cannot rotate produces the maximum speed of the drive wheels 34 and 36 of the vehicle within the speed range of the transmission gearing selected. Intermediate speeds, as noted, are produced by slippage between the brake pads 46 and 48 and the brake disks 42 and 44. Of course, as the vehicle coasts or free wheels, no contact occurs between the brake pads 46 and 48 and brake disks 42 and 44 (no actuation of accelerator pedal 58).

This arrangement provides for unique powering of the vehicle drive wheels 34 and 36. The operation of the internal combustion engine 10 at substantially constant speed and the driving of the electric motors 18 and 20 at substantially constant speed permit optimization of the engine and motor operations. The selective coupling of power through the transaxle units 26 and 28 correlates the constant speed drive to the variable speed of the vehicle drive wheels. Maximum and optimum power transfer are achieved when the brake disks 42 and 44 are locked against movement by the brake pads 46 and 48. For any slippage between the pads and disks some power is lost as frictional heat loss, but such loss is minimal. Thus, driving at top vehicle speed in any given transmission speed range results in optimum performance. By the use of electric motors, of varying torque over a wide power output range, acceleration of the vehicle is uniform for different vehicle loads, e.g., start-up operation on level ground versus on a hill.

A system with individual drive trains for each wheel has been shown and is the presently preferred embodiment. Turning of the vehicle during which one drive wheel rotates at a faster speed than the other is accommodated by different degrees of slippage between the brake disks 42 and 44 and their associated brake pads 46 and 48. A single drive train could be utilized, if desired, with a single one of the transaxle units as shown. In such a case, the power output shaft from the single transaxle unit would be coupled to the typical differential of an automobile and thence to the two drive wheels, for example, the rear wheels of an automobile.

In a presently preferred embodiment of the invention that has been built, a four cylinder Wisconsin gasoline engine model VH4D was employed, regulated for substantially constant speed. The cam shaft was modified to provide maximum torque at 1800 rpm. as contrasted against 2200 rpm. which is typical for that engine. The carburation was also modified to provide for an initial updraft (rather than downdraft) to reduce emissions. The electric generator 12 was a Stamford generator model D8C, 10 kilowat output continuous power, operated at 208 volts, 3-phase alternating electric current. The electric motors 18 and 20 were Baldor 7½ horsepower, 208 volt, 3-phase induction motors operating at 1800 rpm (1725 rpm. under full load). These motors, as noted above, operated at substantially constant speed. The transaxle units 26 and 28 each were conventional transaxle units (1974 Porsche or Volkswagen). In such conventional units, there are two power output shafts for each unit, typically used to drive the two wheels of an automobile In the case of the present invention, one of those power output shafts was selected and used as a control shaft (the shafts 38 and 40) to which a conventional 11 inch diameter brake disk (the disks 42 and 44) was attached. The brake calipers 50 and 52 and associated pads 46 and 48 were conventional automotive units normally used for wheel braking. The clutch and flywheel assemblies 22 and 24 were conventional (also 1974 Porsche or Volkswagen). The drive mechanism was installed in a 1965 Mustang body, with the engine and electric generator installed in the front engine compartment, and the motors, clutches and flywheels, and transaxle units mounted in the rear or trunk compartment of the car.

It will be appreciated that the presently preferred embodiment described above is susceptible of modification. The specific components designated above are also representative only. Accordingly, the invention should be taken to be defined by the following claims.

What is claimed is:

1. A drive mechanism for powering the drive wheel of a vehicle comprising a drive shaft powered at a substantially constant speed to provide a driving force, and a transaxle mechanism having power input and output shafts and a control shaft, said transaxle mechanism shafts being coupled together and operating to provide varying rotation of said power output shaft upon rotation of said power input shaft dependent upon the amount by which said control shaft is restrained from rotation, said power input shaft being coupled to said drive shaft, said power output shaft being coupled to said vehicle drive wheel, and brake means coupled to said control shaft for selectively restraining said control shaft to cause said power output shaft to rotate upon rotation at substantially constant speed of said power input shaft at a rotational speed dependent upon the amount by which said control shaft is restrained from rotating.

2. A drive mechanism according to claim 1, in which said drive shaft is powered at a substantially constant speed by an electric motor.

3. A drive mechanism according to claim 2, in which said electric motor is energized by an electric generator which is in turn driven by an internal combustion engine operated at substantially constant speed.

4. A drive mechanism according to claim 3 for an automobile to be driven over conventional automobile speed ranges, in which said transaxle mechanism includes transmission means therein for varying the rotational speed relationship between said power input and output shafts for a given restraint of said control shaft.

5. An automobile drive mechanism according to claim 4, in which said automobile includes front and rear compartments, said internal combustion engine and said electric generator being located in one of said compartments, and said electric motor and said transaxle mechanism being located in the other of said compartments.

6. A drive mechanism according to claim 1, in which said brake means comprises a brake disk connected to said control shaft, and a brake pad operable to bear against said brake disk.

7. A vehicle having a plurality of drive wheels each powered by an individual drive mechanism according to claim 1.

8. A vehicle according to claim 7, in which said drive shaft of each drive mechanism is driven by an electric motor individual thereto, all of said electric motors being energized by an electric generator which is driven by an internal combustion engine operated at substantially constant speed.

* * * * *